United States Patent
Imada et al.

(10) Patent No.: US 9,731,274 B2
(45) Date of Patent: Aug. 15, 2017

(54) CATALYST CARRIER AND EXHAUST GAS PURIFYING CATALYST

(71) Applicant: Mitsui Mining & Smelting Co., Ltd., Tokyo (JP)

(72) Inventors: Yasunori Imada, Saitama (JP); Yunosuke Nakahara, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 15 days.

(21) Appl. No.: 14/750,362

(22) Filed: Jun. 25, 2015

(65) Prior Publication Data

US 2015/0290622 A1    Oct. 15, 2015

Related U.S. Application Data

(63) Continuation-in-part of application No. PCT/JP2013/084859, filed on Dec. 26, 2013.

(30) Foreign Application Priority Data

Dec. 27, 2012 (JP) ................. 2012-285195

(51) Int. Cl.

| B01J 23/10 | (2006.01) |
| B01J 37/03 | (2006.01) |
| B01D 53/94 | (2006.01) |
| B01J 23/63 | (2006.01) |
| B01J 35/04 | (2006.01) |
| B01J 35/00 | (2006.01) |
| B01J 21/08 | (2006.01) |
| B01J 23/00 | (2006.01) |
| B01J 37/02 | (2006.01) |

(52) U.S. Cl.
CPC .......... *B01J 23/10* (2013.01); *B01D 53/9413* (2013.01); *B01J 21/08* (2013.01); *B01J 23/002* (2013.01); *B01J 23/63* (2013.01); *B01J 35/0006* (2013.01); *B01J 35/04* (2013.01); *B01J 37/0215* (2013.01); *B01J 37/03* (2013.01); *B01J 37/031* (2013.01); *B01J 37/035* (2013.01); *B01J 37/038* (2013.01); *B01D 2255/2042* (2013.01); *B01D 2255/2061* (2013.01); *B01D 2255/2063* (2013.01); *B01D 2255/2065* (2013.01); *B01D 2255/2066* (2013.01); *B01D 2255/40* (2013.01)

(58) Field of Classification Search
CPC .............................. B01J 23/10; B01J 35/0006
USPC ........................................ 502/244, 250, 243
See application file for complete search history.

(56) References Cited

U.S. PATENT DOCUMENTS

2010/0311575 A1* 12/2010 Wakabayashi ....... B01D 53/945
                                                        502/244

FOREIGN PATENT DOCUMENTS

| JP | 724323 | 1/1995 |
| JP | 2007144412 A2 | 6/2007 |
| JP | 2011016124 A2 | 1/2011 |
| JP | 2012-223762 | 11/2012 |

OTHER PUBLICATIONS

International Search Report dated Apr. 1, 2014 filed in PCT/JP2013/084859.
Extended European Search Report dated Jul. 22, 2016 issued in the corresponding European patent application No. 13867287.8.

* cited by examiner

*Primary Examiner* — Matthew E Hoban
*Assistant Examiner* — James Fiorito
(74) *Attorney, Agent, or Firm* — Rankin, Hill & Clark LLP

(57) ABSTRACT

The present invention relates to a catalyst carrier comprising an apatite-type composite oxide and proposes a catalyst carrier capable of improving purification performance of NOx due to improvement of phosphorus poisoning.

Proposed is a catalyst carrier which contains a composite oxide that is represented by a composition formula of $(LaA)_{9.33-\delta}B_6O_{27.00-\gamma}$ (wherein, $0.3 \leq \delta \leq 3.0$, $0.0 < \gamma \leq 6.0$; "A" represents one or two or more elements selected from Ba, Pr, Y, Sr, Mg, and Ce; and "B" represents one or two or more elements selected from Si, P, and Fe).

6 Claims, 1 Drawing Sheet

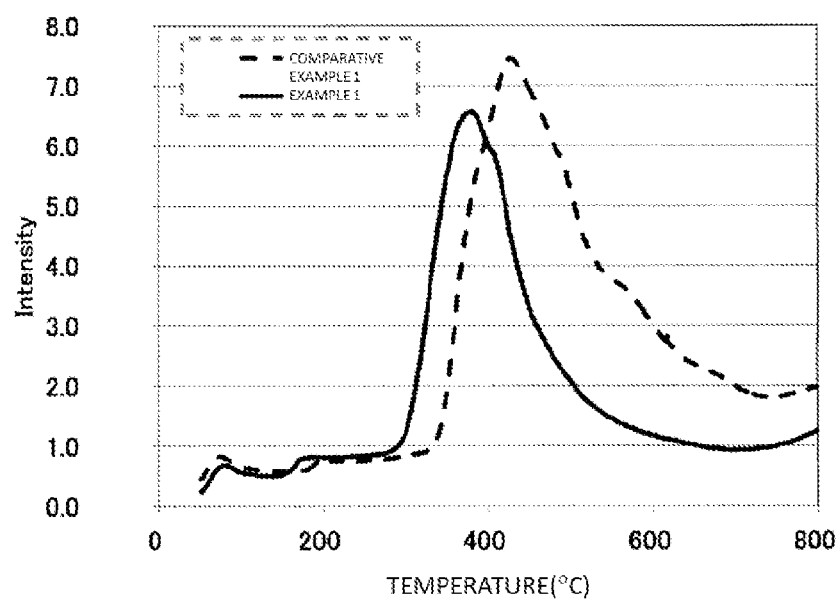

CATALYST CARRIER AND EXHAUST GAS PURIFYING CATALYST

TECHNICAL FIELD

The present invention relates to a catalyst carrier for supporting a catalytically active component and an exhaust gas purifying catalyst using the catalyst carrier.

BACKGROUND ART

An exhaust gas of an internal combustion engine such as an automobile which uses gasoline for fuel contains hazardous components such as hydrocarbon (HC), carbon monoxide (CO), and nitrogen oxide (NOx). It is necessary to simultaneously purify and exhaust each of the hazardous components using an oxidation-reduction reaction. For example, it is necessary to purify in such a manner that the hydrocarbon (HC) is converted into water and carbon dioxide by oxidation; the carbon monoxide (CO) is converted into the carbon dioxide by oxidation; and the nitrogen oxide (NOx) is converted into nitrogen by reduction.

As a catalyst (hereinafter, referred to as an "exhaust gas purifying catalyst") adapted to treat these exhaust gases from the internal combustion engine, three way catalysts (TWC) capable of oxidizing and reducing CO, HC, and NOx have been used.

These kinds of the three way catalysts are known, in which a precious metal is supported on a refractory oxide porous material such as an alumina porous material having a high-specific surface area and the precious metal is supported on a substrate, for example, a monolithic substrate made of a refractory ceramic or metallic honeycomb structure or on refractory particles.

Since a binding force between the noble metal as a catalytically active component and the substrate is not so strong, it is difficult to sufficiently secure a supported amount even when the precious metal is intended to be directly supported on the substrate. In order to support the sufficient amount of catalytically active component on a surface of the substrate, therefore, the precious metal has been supported on a catalyst carrier having a high specific surface area.

A porous material consisting of silica or alumina and a refractory inorganic oxide such as a titania compound is conventionally known as the catalyst carrier. Further, in recent years, a catalyst carrier consisting of an apatite-type composite oxide has received the attention as a catalyst carrier which has excellent heat resistance and can prevent sintering of metal catalyst particles supported thereon.

As the catalyst carrier consisting of the apatite-type composite oxide, for example, Patent Document 1 (JP 7-24323 A) discloses a catalyst carrier consisting of an apatite-type compound expressed by a general formula: $M_{10} \cdot (ZO_4)_6 \cdot X_2$ (where, some of or all of M contain 0.5 to 10 wt % of one or two or more transition metals selected from Group 1B and/or Group 8 of the Periodic Table and preferably one or two or more transition metals selected from copper, cobalt, nickel, and/or iron, Z represents a cation of 3- to 7-valent, and X represents an anion of 1- to 3-valent).

As a catalyst which achieves exhaust gas purification effect even in a relatively low temperature state and achieves purification performance as a three way catalyst even in a high temperature range, Patent Document 2 (JP 2007-144412 A) discloses an exhaust gas purifying catalyst consisting of a composite oxide expressed by $(La_{a-x}M_x)(Si_{6-y}N_y)O_{27-z}$, and a precious metal component that exists in the composite oxide as a solid solution or is supported on the composite oxide, which exhibits high low-temperature activity and excellent heat resistance, and which can obtain stable exhaust gas purification performance.

Patent Document 3 (JP 2011-16124 A) discloses an exhaust gas purifying catalyst consisting of a complex oxide expressed by a general formula: $(A_{a-w-x}M_wM'_x)(Si_{6-y}N_y)O_{27-z}$ (in the formula, A is a cation of at least one of La and Pr; M is a cation of at least one of Ba, Ca, and Sr; M' is a cation of at least one of Nd, Y, Al, Pr, Ce, Sr, Li, and Ca; N is a cation of at least one of Fe, Cu, and Al, and the following are satisfied: $6 \leq a \leq 10$, $0<w<5$, $0 \leq x<5$, $0<w+x \leq 5$, $0 \leq y \leq 3$, $0 \leq z \leq 3$, $A \neq M'$, where $x \neq 0$ when A is a cation of La) and a precious metal component that exists in the composite oxide as a solid solution or is supported on the composite oxide.

CITATION LIST

Patent Document

Patent Document 1: JP H7-24323 A
Patent Document 2: JP 2007-144412 A
Patent Document 3: JP 2011-16124 A

DISCLOSURE OF THE INVENTION

Problem to be Solved by the Invention

The apatite-type composite oxides disclosed in Patent Documents 1 and 3 described above have a problem in that low-temperature characteristic is not sufficient, while having excellent characteristics in which heat resistance is excellent and the supported metal catalyst particles can be prevented from being sintered. In particular, recently, since an engine stop mechanism (idling stop mechanism) for stopping an engine during a vehicle stop such as parking/stopping or waiting for signal is starting to be adopted so as to save fuel or to reduce exhaust gases, the engine is once stopped during the vehicle stop and thus the engine gets to be cold, so that exhaust gases to be discharged from the engine become a low temperature. Therefore, a catalyst having excellent low-temperature characteristics is required.

By the way, it is supposed that an La-based apatite-type composite oxide such as $La_{10}Si_6O_{27}$ or $La_8Sr_2(SiO_4)_6O_2$ has no defect and stoichiometrically-stable crystal structure when a molar ratio of La site is 10. Many of the apatite-type composite oxides disclosed in Patent Documents 1 to 3 described above were apatite-type composite oxides having such a stoichiometric composition.

However, it has been reported that the La-based apatite-type composite oxide has high ion conductivity when the molar ratio of La site is 9.33 (for example, see the card number 01-076-7832 of ICDS (Inorganic Crystal Structure Data base) PDF (Powder Diffraction File)), and it is expected that a catalyst having excellent low-temperature characteristics can be realized when such a La-based apatite-type composite oxide having the molar ratio of 9.33 in La site is used as a catalyst carrier.

Therefore, the invention relates to the La-based apatite-type composite oxide and is to propose a catalyst carrier having superior low-temperature characteristics to the La-based apatite-type composite oxide in which the molar ratio of La site is 9.33.

Means for Solving Problem

The invention proposes a catalyst carrier comprising a composite oxide that is represented by a composition formula of $(LaA)_{9.33-\delta}B_6O_{27.00-\gamma}$ (wherein, $0.3 \leq \delta \leq 3.0$, $0.0 < \gamma \leq 6.0$; "A" represents one or two or more elements selected from Ba, Pr, Y, Sr, Mg, and Ce; and "B" represents one or two or more elements selected from Si, P, and Fe).

Effect of the Invention

According to the catalyst carrier proposed by the invention, lattice oxygen of an apatite crystal structure can be activated when a defect of La site becomes larger compared to the La-based apatite-type composite oxide in which the molar ratio of the La site has a composition of 9.33 (referred to as a "9.33 composition"), and thus it is possible to provide a catalyst having superior low-temperature characteristics to a catalyst which is configured to have the La-based apatite-type composite oxide of 9.33 composition as a catalyst carrier.

BRIEF DESCRIPTION OF DRAWINGS

The FIGURE is a graph illustrating results obtained by performing hydrogen TPR measurement on composite oxides obtained in Example 1 and Comparative Example 1.

MODE(S) FOR CARRYING OUT THE INVENTION

Next, the invention will be described based on an embodiment. However, the invention is not intended to be limited to the embodiment described below.

<Present Catalyst Carrier>

A catalyst carrier (hereinafter, referred to as a "present catalyst carrier") according to an example of the embodiment of the invention is a catalyst carrier for supporting a catalytically active component and a catalyst carrier containing an La-based apatite-type composite oxide (hereinafter, referred to as a "present complex oxide") having a defect larger than that in the case where a molar ratio of La sites is 9.33.

(Present Composite Oxide)

The present composite oxide is a composite oxide expressed by the following composition formula: $(LaA)_{9.33-\delta}B_6O_{27.00-\gamma}$ (wherein, $0.3 \leq \delta \leq 3.0$, $0.0 < \gamma \leq 6.0$)).

The symbol "A" in the above composition formula (1) represents a cation substituted for a portion of the La sites and represents one or two or more elements selected from Ba, Pr, Y, Sr, Mg, and Ce. In addition, the "A" possibly includes Ca, Al, Li, Nd or the like.

Meanwhile, the symbol "B" in the above composition formula (1) represents one or two or more elements selected from Si, P, and Fe. In the case of including Si, it may be a cation substituted for a portion of Si sites. In addition, the "B" possibly includes Cu, Al or the like.

In the above composition formula (1), a molar ratio of elements contained in the La sites is defined as "9.33–δ". That is, the present composite oxide indicates to have a defect larger by "δ" than that in the La-based apatite-type composite oxide in which the molar ratio of the La site has a composition of 9.33 (referred to as a "9.33 composition"), which is generally regarded as a reference composition.

Then, the "δ" is preferably 0.3 to 3.0, more preferably 0.3 to 2.3, and most preferably 0.8 or more or 1.3 or less.

In addition, the molar ratio of the La is preferably 2.50 to 6.00 and more preferably 3.00 or more or 5.00 or less.

Furthermore, in the case of including Pr, the molar ratio of Pr is preferably 0.5 to 3.0 and more preferably 1.0 or more or 2.0 or less.

The "27.00–γ" representing the molar ratio of oxygen (O), that is, the molar ratio of the oxygen is calculated by the following calculation formula in the case where the elements of the La sites are A1, A2, . . . , and An, the molar ratios thereof are x1, x2, . . . , and xn and valences thereof are a1, a2, . . . , and an:

"$27.00-\gamma$"$=(x1 \times a1 + x2 \times a2 + \ldots + xn \times an)/2$

Specific examples of these types of La-based apatites include, for example, $La_{9.33-\delta}Si_6O_{27.00-\gamma}$, $(LaBa)_{9.33-\delta}Si_6O_{27.00-\gamma}$, $(LaBaY)_{9.33-\delta}Si_6O_{27.00-\gamma}$, $(LaBaSr)_{9.33-\delta}Si_6O_{27.00-\gamma}$, $(LaBaMg)_{9.33-\delta}Si_6O_{27.00-\gamma}$, $(LaBaCe)_{9.33-\delta}Si_6O_{27.00-\gamma}$, $(LaPr)_{9.33-\delta}Si_6O_{27.00-\gamma}$, $(LaPrBa)_{9.33-\delta}Si_6O_{27.00-\gamma}$, $(LaPrY)_{9.33-\delta}Si_6O_{27.00-\gamma}$, $(LaPrSr)_{9.33-\delta}Si_6O_{27.00-\gamma}$, $(LaPrMg)_{9.33-\delta}Si_6O_{27.00-\gamma}$, $(LaPrCe)_{9.33-\delta}Si_6O_{27.00-\gamma}$, $(LaPrBaY)_{9.33-\delta}Si_6O_{27.00-\gamma}$, $(LaPrBaSr)_{9.33-\delta}Si_6O_{27.00-\gamma}$, $(LaPrBaCe)_{9.33-\delta}Si_6O_{27.00-\gamma}$, and $(LaPrBaMg)_{9.33-\delta}Si_6O_{27.00-\gamma}$.

The fact that the present catalyst carrier contains the composite oxide represented by the above composition formula can be verified in such a manner that a single phase of apatite is confirmed by a diffraction peak of X-ray diffraction (XRD) and that a mass of an element is measured by ICP.

(Other Catalyst Carrier Components)

The present catalyst carrier may contain carrier components other than the present complex oxide, for example, a porous material of the compound selected from a group consisting of a silica compound, an alumina compound, and a titania compound and more specifically other carrier components such as a porous material consisting of the compound selected from, for example, alumina, silica, silica-alumina, alumino-silicate, alumina-zirconia, alumina-chromia, and alumina-ceria.

(Shape Of Present Catalyst Carrier)

The present catalyst carrier may have a particulate shape or other shapes.

(Action of Present Catalyst Carrier)

Catalytic reactions of a hydrocarbon (HC), a carbon monoxide (CO), and a nitrogen oxide (NOx) can be represented by the following reaction formulas, respectively.

(1) HC reaction (for example, in the case of $C_3H_6$)

$$C_3H_6 + 9/2 O_2 \rightarrow 3CO_2 + 3H_2O$$

(2) CO reaction $$CO + 1/2 O_2 \rightarrow CO_2$$

(3) NOx reaction (for example, in the case of NO)

$$2NO + 2CO \rightarrow N_2 + 2CO_2$$

$18NO + HC$ (for example, $2C_3H_6) \rightarrow 9N_2 + 6CO_2 + 6H_2O$

In order to enhance a catalytic activity in the above reactions, the catalyst causes the oxygen to be easily supplied in the reactions (1) and (2); and the catalyst causes the oxygen (O) to be separated from NO so that the oxygen may be easily supplied to CO/HC in the reaction (3).

It is found that lattice oxygen of the apatite crystal structure can be activated when the defect of the La site becomes larger compared to the La-based apatite-type composite oxide in which the molar ratio of the La site has a composition of 9.33 (referred to as a "9.33 composition") and the catalytic reaction can be accelerated compared to the La-based apatite-type composite oxide of 9.33 composition, so that the catalytic reaction can be generated at a lower temperature.

The activation of the lattice oxygen in the apatite crystal structure can be confirmed by hydrogen TPR measurement.

The hydrogen TPR measurement means the measurement of investigating a reaction temperature in the reaction formula of $H_2+O^* \rightarrow H2O$ ($O^*$ is oxygen in the lattice), and the reaction temperature becomes a lower temperature when the lattice oxygen is activated.

(Method of Producing Present Catalyst Carrier)

In the present catalyst carrier, the complex oxide consisting of a raw material, for example, La, Pr, Ba, Si, and O is produced in such a manner that lanthanum nitrate, barium nitrate, praseodymium nitrate, colloidal silica, and other raw material components as needed are added to deionized water and the resultant mixture was stirred, thereby obtaining a transparent solution; the transparent solution is dropped to a mixture solution of ammonia water and ammonium carbonate, thereby precipitating a precipitate by hydrolysis; the obtained precipitate is aged at a predetermined temperature and then washed with water, followed by filtration and drying, thereby obtaining a precursor; and then the precursor is calcined at 800 to 1000° C. under air atmosphere, resulting in obtaining the complex oxide. However, it is not limited to such a producing method.

<Present Exhaust Gas Catalyst>

An exhaust gas catalyst as an example of the embodiment according to the invention (hereinafter, referred to as "present catalyst") is an exhaust gas purifying catalyst that contains the present catalyst carrier, a catalytically active component which exists in the present catalyst carrier as a solid solution or is supported on the present catalyst carrier, an OSC material as needed, and other components.

(Catalytically Active Component)

The present catalyst carrier itself exerts oxidation catalyst action, but has significant catalytic action when the following metals are supported thereon as a catalytically active component.

That is, the catalytically active component supported on the present catalyst may contain a metal such as palladium, platinum, rhodium, gold, silver, ruthenium, iridium, nickel, cerium, cobalt, copper, osmium, or strontium. More preferably, the catalytically active component contains platinum, palladium, rhodium, or iridium.

(OSC Material)

Preferably, the present catalyst may contain a promoter (OSC material; OSC: Oxygen Storage Capacity) having oxygen storage capacity.

The OSC material may include, for example, a cerium compound, a zirconium compound, a ceria-zirconia complex oxide, or the like.

(Other Components)

The present catalyst may contain other components such as a stabilizer other than the above component.

The stabilizer may include, for example, an alkaline-earth metal or an alkaline metal. Preferably, the stabilizer can be selected from one kind or two or more kinds of metals selected from a group consisting of magnesium, barium, boron, thorium, hafnium, silicon, calcium, and strontium. Among them, the barium is preferred in terms of having the highest temperature at which PdOx is reduced, that is, in terms of being hard to be reduced.

In addition, the stabilizer may include a known additive component such as a binder component.

The binder component may use inorganic binder, for example, an aqueous solution such as an alumina sol.

(Form of Present Catalyst)

The present catalyst can be used alone as a catalyst by being molded in the form of an appropriate shape such as a pellet and can be used as a form of being supported on a substrate consisting of ceramics or metal materials.

(Substrate)

The material of the substrate may include refractory materials such as a ceramics, or metal materials.

The material of the ceramic substrate may include a refractory ceramic material, for example, cordierite, cordierite-alpha alumina, silicon nitride, zircon mullite, alumina-silica magnesia, zircon silicate, sillimanite, magnesium silicate, zircon, petalite, alpha alumina, alumino-silicates, and the like.

The material of the metal substrate may include a refractory metal, for example, other suitable corrosion-resistant alloys based on stainless steel or iron.

The shape of the substrate may include a honeycomb shape, a pellet shape, or a spherical shape.

The honeycomb material may use, for example, a cordierite material such as the ceramics. In addition, the honeycomb material may use the honeycomb formed of a metal material such as ferritic stainless steel.

(Method of Producing Present Catalyst)

An example of the method of producing the present catalyst may include a method of: obtaining a slurry by mixing and stirring the present catalyst carrier, the catalytically active component, the OSC material as needed, the stabilizer, the binder, and water with each other; coating the obtained slurry onto the substrate such as, for example, a ceramic honeycomb body by a wash coat; and calcining the slurry-coated substrate, thereby forming a catalyst layer on the surface of the substrate.

In addition, the method of producing the present catalyst may include a method of: obtaining a slurry by mixing and stirring the present catalyst carrier, the OSC material as needed, the stabilizer, the binder, and water with each other; and coating the obtained slurry onto the substrate such as, for example, a ceramic honeycomb body by a wash coat, thereby forming a catalyst carrier layer; subsequently immersing the catalyst carrier layer into a solution in which the catalytically active component is dissolved to absorb the catalytically active component on the catalyst carrier layer; and calcining the catalyst active component-absorbed catalyst carrier layer, thereby forming a catalyst layer on the surface of the substrate.

In addition, the method of producing the present catalyst may include a method of: obtaining a slurry by mixing and stirring, for example, a catalytically active component carrier in which the catalytically active component is supported on the oxide, the present catalyst carrier, the OSC material as needed, the stabilizer, the binder, and the water; coating the obtained slurry onto the substrate; and calcining the slurry-coated substrate, thereby forming a catalyst layer on the surface of the substrate.

Furthermore, the method of producing the present catalyst can employ all of the known methods, and is not limited to the above examples.

In any method of producing the present catalyst, the catalyst layer may be a single layer or multilayers of two or more layers.

The present catalyst carrier is easily formed with pores having a predetermined size and when the catalyst is used as an inorganic porous material of an upper catalyst layer, that is, a catalyst layer on a side to which an exhaust gas flows, it is preferable in that gas diffusivity into a lower catalyst layer is further improved. In addition, since the present catalyst carrier functions as a carrier for supporting precious metals and also has a catalytic activity for oxidizing a hydrocarbon (HC) and a carbon monoxide (CO) and a catalytic activity for reducing a nitrogen oxide (NOx), it also has advantage of being capable of decreasing the content of the precious metals.

Therefore, from the viewpoint of improving the gas diffusivity into the lower catalyst layer, the present catalyst carrier preferably occupies 50 mass % or more of the inorganic porous material which is contained in the upper catalyst layer and more preferably 70 mass % or more, even more preferably 80 mass % or more, and particularly preferably 90 mass % or more (including 100 mass % or more).

The upper catalyst layer may contain, for example, alumina, an OSC material, or other inorganic porous materials as other porous materials of the present catalyst carrier.

<Explanation of Expressions>

In this specification, when the expression "X to Y" (X and Y are arbitrary numbers) is used, unless otherwise explicitly mentioned, the meaning of "X or greater but Y or less" is included and at the same time, the meaning of "preferably greater than X" or "preferably Y or less" is included.

In addition, the expression "X or greater" (X is an arbitrary number) or "Y or less" (Y is an arbitrary number) includes the intention of "it is preferable to be greater than X" or "it is preferable to be less than Y".

EXAMPLES

Hereinafter, the invention will be described in detail based on following Examples and Comparative Examples.

Example 1, Comparative Example 1

Lanthanum nitrate, barium nitrate, praseodymium nitrate, yttrium nitrate, and colloidal silica were weighed so as to be a molar ratio of La:Pr:Ba:Y:Si:O=3.53:1.80:2.00:1.00:6.00:24.10 in Example 1 and to be a molar ratio of La:Pr:Ba:Y:Si:O=4.00:3.33:1.00:1.00:6.00:26.60 in Comparative Example 1 and were added to deionized water and the resultant mixture was stirred, thereby obtaining a transparent solution.

The transparent solution was dropped to a mixture solution of ammonia water and ammonium carbonate, thereby obtaining a precipitate. The obtained precipitate was aged at 40° C. for 24 hours and then washed with water, followed by filtration and drying at 100° C., thereby obtaining a precursor. Then, the precursor was calcined at 900° C. for six hours under air atmosphere, thereby obtaining a composite oxide.

The composition of the obtained composite oxide was subjected to X-ray diffraction (XRD) and thus it was confirmed to have a single phase of apatite depending on a diffraction peak of the X-ray diffraction, and it was confirmed that a composite oxide obtained in Example 1 was $La_{3.53}Pr_{1.80}Ba_{2.00}Y_{1.00}Si_{6.00}O_{24.10}$ ($\delta=1.00$) and a composite oxide obtained in Comparative Example 1 was $La_{4.00}Pr_{3.33}Ba_{2.00}Y_{1.00}Si_{6.00}O_{26.60}$ ($\delta=0.00$) by mass spectrometry of elements using ICP.

(Hydrogen TPR Measurement)

The composite oxides obtained in Example 1 and Comparative Example 1 described above were respectively set by 0.02 g in a quart reaction tube, a temperature was raised by 10° C. per minute in the range of 50 to 800° C. while allowing 3% hydrogen and $N_2$-Balance gas to be flowed by 20 mL per minute into the reaction tube, and the mass number 18 of $H_2O$ generated by the reaction between lattice oxygen and lattice hydrogen was measured using a mass spectrometer, so that a reaction temperature of the lattice oxygen was measured from a desorption peak of water. Results are illustrated in the FIGURE.

Referring to the FIGURE, the reaction temperature in Example 1 was shifted to a low-temperature side compared to the reaction temperature in Comparative Example 1, and thus it was found that the lattice oxygen was more activated in apatite having a larger defect of the La site obtained in Example 1 compared to that obtained in Comparative Example 1 (9.33 composition).

Examples 2 to 7 and Comparative Example 2

Lanthanum nitrate and colloidal silica were weighed so as to be a molar ratio indicated in Table 1 and were added to deionized water and the resultant mixture was stirred, thereby obtaining a transparent solution. In this case, from Example 2 to Example 7, a defect of La site became gradually larger as the amount of La was reduced from the composition (9.33 composition used as a reference) in Comparative Example 2.

The transparent solution was dropped to a mixture solution of ammonia water and ammonium carbonate, thereby obtaining a precipitate. The obtained precipitate was aged at 40° C. for 24 hours and then washed with water, followed by filtration and drying at 100° C., thereby obtaining a precursor. Then, the precursor was calcined at 900° C. for six hours under air atmosphere, thereby obtaining a composite oxide.

Each of the obtained composite oxides was subjected to X-ray diffraction (XRD) and thus it was confirmed to have a single phase of apatite depending on a diffraction peak of the X-ray diffraction, and it was confirmed that the obtained composite oxide was an La-based apatite-type composite oxide composed of molar ratios indicated in Table 1 by mass spectrometry of elements using ICP.

The obtained composite oxide (90 parts by mass), a sol (referred to as an "alumina sol", 10 parts by mass) in which $Al_2O_3$ was a dispersed material, and water (130 parts by mass) were mixed with each other in a ball mill, thereby obtaining slurry A.

In addition, activated alumina (30 parts by mass), $CeZrO_2$ (60 parts by mass), alumina sol (10 parts by mass), and water (150 parts by mass) were mixed with each other in the ball mill, thereby obtaining slurry B.

A cordierite honeycomb substrate (having a size of φ25.4×30 mm) was immersed in the slurry B and pulled out therefrom, and then excess slurry was blown off. Subsequently, the substrate was dried at 90° C. for 10 minutes and calcined at 600° C. for three hours, resulting in forming a coat layer and thus obtaining a honeycomb substrate with the coat layer. The amount of the coat layer was 160 g per 1 L of the honeycomb substrate.

The obtained honeycomb substrate with the coat layer was immersed in a Pd nitrate solution and pulled out therefrom, and then excess droplets were blown off. Thereafter, the honeycomb substrate was dried at 90° C. for 10 minutes and calcined at 600° C. for three hours, thereby supporting Pd of 0.60 g per 100 g of the coat layer (corresponding to 1 L of the honeycomb base material), resulting in forming a first precious-metal-supported layer.

Subsequently, the honeycomb substrate on which the first precious-metal-supported layer had been formed was immersed in the slurry A and pulled out therefrom, and then excess slurry was blown off. Thereafter, the honeycomb substrate was dried at 90° C. for 10 minutes and calcined at 600° C. for three hours, resulting in forming a coat layer and thus obtaining a honeycomb substrate with the coat layer. The amount of the coat layer was 100 g per 1 L of the honeycomb substrate.

The obtained honeycomb substrate with the coat layer was immersed in the Pd nitrate solution and pulled out therefrom, and then excess droplets were blown off. Thereafter, the honeycomb substrate was dried at 90° C. for 10 minutes and calcined at 600° C. for three hours, thereby supporting Pd of 0.20 g per 100 g of the coat layer (corresponding to 1 L of the honeycomb base material) and thus forming a second precious-metal-supported layer, resulting in obtaining an exhaust gas purifying catalyst structures.

The exhaust gas purifying catalyst structures obtained in Example and Comparative Example described above were cored into 15 cc, each of the exhaust gas purifying catalysts was separately charged into an evaluation apparatus (MOTOR EXHAUST GAS ANALYZER MEXA9100 manufactured by Horiba Ltd.), and then light-off performance was obtained by allowing an exhaust model gas having the composition indicated below to be flowed into the evaluation apparatus at a space velocity of 100,000/h and raising a temperature up to 500° C. at a temperature rising rate of 20° C./minute. From evaluation results of the obtained light-off performance, a temperature (T50) at which a purification rate of each of the CO/HC/NO gases reached 50% was obtained. The obtained results were indicated in Table 1.

The composition of the model gas is as follows:
A/F=14.6, CO: 0.50%, $H_2$: 0.17%, $O_2$: 0.50%, NO (NOx): 500 ppm, $C_3H_6$ (HC): 1200 ppmC, $CO_2$: 14%, $H_2O$: 10%, and $N_2$: balance Thereafter, the samples, which were subjected to the coring to measure the purification performance, were further set in an electric furnace kept at 700° C. and were treated for 25 hours by periodically flowing a simulation exhaust gas (50 s) and air (50 s) and then a temperature (T50) at which a purification rate of each of the CO/HC/NO gases reached 50% was obtained in the same manner as described above, the simulation exhaust gas being intended for complete combustion and containing $C_3H_6$ of 5,000 ppmC, $O_2$ of 0.75%, and residual $N_2$.

Results observed by the durability treatment were indicated in a "durability" column of Table 1; deterioration was evaluated as "Δ", little deterioration was evaluated as "○", and no deterioration was evaluated as "⊙".

In the light of the overall determination, it is considered that the defect (δ) of the La site is preferably 0.3 to 3.0, more preferably 0.3 to 2.3, and most preferably 0.8 or more or 1.3 or less.

When attention is paid to the purification performance of HC, it is considered that the defect δ is more preferably 0.8 to 1.3. In addition, when attention is paid to the purification performance of NOx, it is considered that the defect δ is more preferably 1.0 to 2.8.

Examples 4 and 8 to 12

Lanthanum nitrate, praseodymium nitrate, and colloidal silica were weighed so as to be a molar ratio indicated in Table 2 and were added to deionized water and the resultant mixture was stirred, thereby obtaining a transparent solution. The transparent solution was dropped to a mixture solution of ammonia water and ammonium carbonate, thereby obtaining a precipitate. The obtained precipitate was aged at 40° C. for 24 hours and then washed with water, followed by filtration and drying at 100° C., thereby obtaining a precursor. Then, the precursor was calcined at 900° C. for six hours under air atmosphere, thereby obtaining a composite oxide.

Each of the obtained composite oxides was subjected to X-ray diffraction (XRD) and thus it was confirmed to have a single phase of apatite depending on a diffraction peak of the X-ray diffraction, and it was confirmed that the obtained composite oxide was an La-based apatite-type composite oxide composed of molar ratios indicated in Table 2 by mass spectrometry of elements using ICP.

An exhaust gas purifying catalyst structures was prepared in the same manner as in Examples 2 to 7 described above using the obtained composite oxide and light-off performance was evaluated, so that a temperature (T50) at which a purification rate of each of the CO/HC/NO gases reached 50% was obtained. The obtained results were indicated in Table 2.

TABLE 1

| | Defect | Apatite composition | | | T50 (° C.) | | | | Overall |
|---|---|---|---|---|---|---|---|---|---|
| | (δ) | La | Si | O | NOx | CO | HC | Durability | determination |
| Comparative Example 2 | 0.00 | 9.33 | 6.00 | 26.00 | 351 | 300 | 327 | ⊙ | X |
| Example 2 | 0.30 | 9.03 | 6.00 | 25.55 | 340 | 285 | 315 | ⊙ | ○ |
| Example 3 | 0.80 | 8.53 | 6.00 | 24.80 | 336 | 264 | 305 | ⊙ | ⊙ |
| Example 4 | 1.00 | 8.33 | 6.00 | 24.50 | 331 | 265 | 302 | ⊙ | ⊙ |
| Example 5 | 1.30 | 8.03 | 6.00 | 24.05 | 335 | 269 | 300 | ⊙ | ⊙ |
| Example 6 | 2.30 | 7.03 | 6.00 | 22.55 | 332 | 262 | 309 | ○ | ○ |
| Example 7 | 2.80 | 6.53 | 6.00 | 21.80 | 330 | 269 | 305 | Δ | Δ |

From Table 1, it was found that the temperatures T50 of NOx, CO, and HC were lowered and the purification performance was improved at a low temperature when the defect (δ) of the La site was larger than that in Comparative Example 2 having the composition (9.33 composition) used as a reference.

Meanwhile, since the crystal structure is unstable as the defect (δ) of the La site becomes large, the reduction in durability (deterioration in performance) was observed.

TABLE 2

| | Defect | Apatite composition | | | | T50 (° C.) | | |
|---|---|---|---|---|---|---|---|---|
| | (δ) | La | Pr | Si | O | NOx | CO | HC |
| Example 4 | 1.00 | 8.33 | 0.00 | 6.00 | 24.50 | 331 | 265 | 302 |
| Example 8 | 1.00 | 7.83 | 0.50 | 6.00 | 24.66 | 323 | 267 | 301 |
| Example 9 | 1.00 | 7.33 | 1.00 | 6.00 | 24.83 | 318 | 265 | 305 |
| Example 10 | 1.00 | 6.83 | 1.50 | 6.00 | 25.00 | 315 | 262 | 302 |

TABLE 2-continued

| | Defect | Apatite composition | | | | T50 (° C.) | | |
|---|---|---|---|---|---|---|---|---|
| | (δ) | La | Pr | Si | O | NOx | CO | HC |
| Example 11 | 1.00 | 6.33 | 2.00 | 6.00 | 25.16 | 320 | 267 | 301 |
| Example 12 | 1.00 | 5.33 | 3.00 | 6.00 | 25.50 | 329 | 264 | 303 |

From Table 2, when a portion of La site is substituted by Pr in the La-based apatite-type composite oxide, it was found that the purification performance of NOx was improved. This was considered because an effect of removing oxygen "O" from NOx was improved by the addition of Pr.

From this result and the test results which have been performed so far, it is considered that the molar ratio of Pr in the present composite oxide is preferably 0.5 to 3.0 and more preferably 1.0 or more or 2.0 or less.

Examples 10 and 13 to 17

Lanthanum nitrate, barium nitrate, praseodymium nitrate, yttrium nitrate, stronitium nitrate, magnesium nitrate, and colloidal silica were weighed so as to be a molar ratio indicated in Table 3 and were added to deionized water and the resultant mixture was stirred, thereby obtaining a transparent solution. The transparent solution was dropped to a mixture solution of ammonia water and ammonium carbonate, thereby obtaining a precipitate. The obtained precipitate was aged at 40° C. for 24 hours and then washed with water, followed by filtration and drying at 100° C., thereby obtaining a precursor. Then, the precursor was calcined at 900° C. for six hours under air atmosphere, thereby obtaining a composite oxide.

Each of the obtained composite oxides was subjected to X-ray diffraction (XRD) and thus it was confirmed to have a single phase of apatite depending on a diffraction peak of the X-ray diffraction, and it was confirmed that the obtained composite oxide was an La-based apatite-type composite oxide composed of molar ratios indicated in Table 3 by mass spectrometry of elements using ICP.

An exhaust gas purifying catalyst structures was prepared in the same manner as in Examples 2 to 7 described above using the obtained composite oxide and light-off performance was evaluated, so that a temperature (T50) at which a purification rate of each of the CO/HC/NO gases reached 50% was obtained. The obtained results were indicated in Table 3.

From Table 3, when a portion of La site is substituted by an element of Group 2A such as Ba, Sr, or Mg or Y together with Pr in the La-based apatite-type composite oxide, it was found that the purification rate of CO and HC was further improved. This was considered because the capacity of supplying oxygen to CO and HC was improved by the substitution with the element of Group 2A or Y.

Above all, it was found that the substitution with Ba and/or Y was preferred.

Comparative Examples 3 and 4 and Examples 18 to 21

Lanthanum nitrate, praseodymium nitrate, barium nitrate, yttrium nitrate, and colloidal silica were weighed so as to be a molar ratio indicated in Table 4 and were added to deionized water and the resultant mixture was stirred, thereby obtaining a transparent solution. The transparent solution was dropped to a mixture solution of ammonia water and ammonium carbonate, thereby obtaining a precipitate. The obtained precipitate was aged at 40° C. for 24 hours and then washed with water, followed by filtration and drying at 100° C., thereby obtaining a precursor. Then, the precursor was calcined at 900° C. for six hours under air atmosphere, thereby obtaining a composite oxide.

Each of the obtained composite oxides was subjected to X-ray diffraction (XRD) and thus it was confirmed to have a single phase of apatite depending on a diffraction peak of the X-ray diffraction, and it was confirmed that the obtained composite oxide was an La-based apatite-type composite oxide composed of molar ratios indicated in Table 4 by mass spectrometry of elements using ICP.

(NO-TPD measurement)

After the composite oxides obtained in Comparative Examples 3 and 4 and Examples 18 to 21 were respectively set by 0.10 g in a quart reaction tube and were subjected to NO absorption, a temperature was raised in the range of 50 to 800° C. while flowing He gas to be flowed by 20 mL per minute into the reaction tube, and the mass number 30 of the absorbed NO was measured using a mass spectrometer, so that a reaction temperature (referred to as "desorption peak temperature of NO") of NO activity point was measured from a desorption peak of NO. Results are illustrated in Table 4.

TABLE 3

| | | Apatite composition | | | | | | | | T50 (° C.) | | |
|---|---|---|---|---|---|---|---|---|---|---|---|---|
| | Defect (δ) | La | Pr | Ba | Y | Sr | Mg | Si | O | NOx | CO | HC |
| Example 10 | 1.00 | 6.83 | 1.50 | 0.00 | 0.00 | 0.00 | 0.00 | 6.00 | 25.00 | 315 | 262 | 302 |
| Example 13 | 1.00 | 5.83 | 1.50 | 1.00 | 0.00 | 0.00 | 0.00 | 6.00 | 24.50 | 316 | 256 | 294 |
| Example 14 | 1.00 | 5.83 | 1.50 | 0.00 | 1.00 | 0.00 | 0.00 | 6.00 | 25.00 | 320 | 255 | 295 |
| Example 15 | 1.00 | 3.83 | 1.50 | 2.00 | 1.00 | 0.00 | 0.00 | 6.00 | 24.00 | 320 | 250 | 290 |
| Example 16 | 1.00 | 3.83 | 1.50 | 2.00 | 0.00 | 1.00 | 0.00 | 6.00 | 23.50 | 318 | 258 | 298 |
| Example 17 | 1.00 | 4.83 | 1.50 | 1.00 | 0.00 | 0.00 | 1.00 | 6.00 | 24.00 | 319 | 259 | 297 |

TABLE 4

| | La | Pr | Ba | Y | Si | O | Desorption peak temperature of NO (° C.) |
|---|---|---|---|---|---|---|---|
| Comparative Example 3 | 5.83 | 1.50 | 0.00 | 1.00 | 6.00 | 24.00 | 520 |
| Example 18 | 4.83 | 1.50 | 1.00 | 1.00 | 6.00 | 24.00 | 529 |
| Example 19 | 3.83 | 1.50 | 2.00 | 1.00 | 6.00 | 24.00 | 550 |
| Example 20 | 2.83 | 1.50 | 3.00 | 1.00 | 6.00 | 24.00 | 554 |
| Example 21 | 5.33 | 0.00 | 2.00 | 1.00 | 6.00 | 24.00 | 550 |
| Comparative Example 4 | 7.33 | 0.00 | 1.00 | 0.00 | 6.00 | 24.00 | 520 |

From the test results in Table 4 and test results which have been made, since it is possible to increase the NOx absorption point while achieving the structural stabilization when Ba and Y are contained in the La sites, it was found that the desorption peak temperature of NO could rise and the purification performance of NO could be further improved.

At this time, it was found that the molar ratio of Ba was preferably 0.5 to 3.5 and more preferably 1.5 or more or 3.0 or less.

On the other hand, it was found that the molar ratio of Y was preferably 0.5 to 2.5 and more preferably 0.8 or more or 1.5 or less.

Furthermore, the La site may or may not contain Pr. When the La site contains Pr, it was found that the molar ratio of Pr was preferably 0.5 to 3.0, more preferably 1.0 or more or 2.5 or less, and even more preferably 2.0 or less.

The invention claimed is:

1. A catalyst carrier comprising a composite oxide that is represented by a composition formula of $(LaA)_{9.33-\delta}B_6O_{27.00-\gamma}$ wherein, $0.3 \leq \delta \leq 3.0$, $0.0 < \gamma \leq 6.0$; "A" comprises Ba, Pr, and Y; and "B" represents one or two or more elements selected from Si, P, and Fe.

2. The catalyst carrier according to claim 1, wherein the element "B" in the composition formula comprises Si.

3. An exhaust gas purifying catalyst comprising the catalyst carrier according to claim 1 and a catalytically active component that exists in the catalyst carrier as a solid solution or is supported on the catalyst carrier.

4. An exhaust gas purifying catalyst having two or more catalyst layers, wherein an upper catalyst layer of the two or more catalyst layers contains the catalyst carrier according to claim 1 and a catalytically active component that exists in the catalyst carrier as a solid solution or is supported on the catalyst carrier.

5. An exhaust gas purifying catalyst comprising the catalyst carrier according to claim 2 and a catalytically active component that exists in the catalyst carrier as a solid solution or is supported on the catalyst carrier.

6. An exhaust gas purifying catalyst having two or more catalyst layers, wherein an upper catalyst layer of the two or more catalyst layers contains the catalyst carrier according to claim 2 and a catalytically active component that exists in the catalyst carrier as a solid solution or is supported on the catalyst carrier.

* * * * *